United States Patent [19]

Coester

[11] 4,249,265
[45] Feb. 3, 1981

[54] DEVICE FOR RECEIVING AND TRANSMITTING CODED LIGHT SIGNALS AND IFF SYSTEM INCORPORATING THIS DEVICE

[75] Inventor: Jean Y. Coester, Paris, France

[73] Assignee: Societe Anonyme de Telecommunications, Paris, France

[21] Appl. No.: 79,558

[22] Filed: Sep. 27, 1979

[30] Foreign Application Priority Data

Oct. 6, 1978 [FR] France .................. 78 28683

[51] Int. Cl.³ ............ H04B 9/00; H01Q 15/80; H01S 3/00
[52] U.S. Cl. .................... 455/604; 455/605; 455/606; 343/18 D; 332/7.51
[58] Field of Search .......... 455/601, 604, 605, 606; 343/6.5 R, 6.8 R, 18 B, 18 C, 18 D; 332/7.51

[56] References Cited

U.S. PATENT DOCUMENTS

| 3,432,853 | 3/1969 | Wise .................. 343/6.8 R |
| 3,433,960 | 3/1969 | Mimott .................. 455/605 |
| 3,493,294 | 2/1970 | Fitzmaurice .......... 455/605 |
| 3,584,220 | 6/1971 | Nomisra et al. ...... 455/605 |
| 3,633,158 | 1/1972 | Heibel .................. 455/605 |
| 3,863,064 | 1/1975 | Doyle et al. .......... 455/605 |
| 4,134,008 | 1/1979 | de Corlieu et al. ... 455/604 |
| 4,143,263 | 3/1979 | Eichweber ............ 455/606 |

FOREIGN PATENT DOCUMENTS 1429289 3/1976 United Kingdom ............ 455/604

*Primary Examiner*—Robert L. Griffin
*Assistant Examiner*—Edward L. Coles
*Attorney, Agent, or Firm*—Holman & Stern

[57] ABSTRACT

A device to receive coded light signals and to transmit modulated light signals in the direction of the incident signals, comprising an omnidirectional detection device composed of a plurality of radiation sensors, an optical device for reflecting the light signal in its own direction, a recognition and encoding circuit connected to the sensors and an optical modulator operable to prevent the reflection of the light signal, the modulator being controlled by the recognition and encoding circuit, the modulator comprising a shutter rotatable about the axis of the detection device, a member for driving the shutter controlled by the recognition and encoding circuit and a second circuit connected to the outputs of the sensors to determine which one of the sensors receives the incident beam, the second circuit delivering to the drive member a control signal for setting the initial angular position of the shutter.

8 Claims, 5 Drawing Figures

DEVICE FOR RECEIVING AND TRANSMITTING CODED LIGHT SIGNALS AND IFF SYSTEM INCORPORATING THIS DEVICE

The present invention relates to a device adapted to receive coded light signals and to transmit modulated light signals in the direction of the incident signals. Such a device may be used in particular as a responder device in an optical system for identification, friend or foe, or IFF system, comprising in addition an interrogation device capable of transmitting a coded light signal, particularly a pulsed laser beam, in the direction of a remote object, and of detecting the possible return of the beam.

German Pat. application No. 2 453 077 (U.S. Pat. No. 4,143,263) discloses a device of this type, comprising an omnidirectional detection device composed of a plurality of radiation sensors, an optical device for reflecting the light signal in its own direction, a recognition and encoding circuit connected to said sensors and an optical modulator operable to prevent the reflection of the light signal, said modulator being controlled by said circuit.

The recognition circuit incorporates a memory in which coding data are recorded. It makes a comparison between the received signal and the coding data. If the incident signal has a pattern consistent with the coding data, this means that it originates from a friend interrogation device and, in this case, the recognition circuit controls the modulator to allow the reflection of the incident light signal in modulated form. The detection of a modulated reflected signal by the interrogation device makes it possible to identify the object on which the beam is directed as friend, as on the one hand, the reflection results in a light power much greater than that resulting from a simple back-diffusion by the object and, on the other hand, the reflected signal is coded by the modulator.

In the above-mentioned German Patent Application, the modulator is an electro-optical modulator constituted for example by liquid crystals, Kerr cells, etc, which allows the light to pass in response to the application of a control signal. However, the modulators of this type must be adapted to the wave-length of the radiation to be modulated as they are operative only in limited spectral bands. In addition, they cause a diffraction of the beam and consequently are only suitable for the visible and near infrared radiations, but are not at all suitable for the intermediate infrared radiations (wave-length around 10 $\mu$m), which is nevertheless highly favourable from the standpoint of propagation in the atmosphere. The diffraction is in fact proportional to the wave-length of the diffracted radiation, and is therefore 10 times greater with a wave-length of 10 $\mu$m than with a wave-length of 1 $\mu$m. To compensate for this disadvantageous influence of the wave-length, the dimensions of the modulator should be increased in the same proportion. Now, the only electro-optical modulators suitable in the intermediate infrared are crystals whose dimensions are always very limited for practical reasons and cannot be increased as desired.

It is therefore an object of the present invention to provide a device for receiving and re-transmitting coded light signals, which operates to a wide extent irrespective of the wave-length of the incident signals.

To this end, according to the invention, the modulator comprises a shutter rotatable about the axis of the detection device, a member for driving the shutter controlled by the recognition and encoding circuit and a second circuit connected to the outputs of the sensors to determine which one of the sensors receives the incident beam, said second circuit delivering to the drive member a control signal for setting the initial angular position of the shutter.

The operation of a mechanical shutter takes place quite irrespective of the wave-length of the incident radiation. Furthermore, the use of such a shutter does not raise any significant diffraction problem.

In a preferred embodiment, there is provided a single retroreflector rotatable about the same axis as the shutter and a member for driving the retroreflector controlled by said second circuit so as to be orientated in the direction of the sensor receiving the beam, and, in addition, it may advantageously be provided a second shutter rotatable with the retroreflector and constituted by a cylindrical wall provided with an aperture of which the width corresponds substantially to the opening of the retroreflector.

The sensors are advantageously pyroelectric sensors. Pyroelectric sensors are responsive to the variations in temperature and therefore operative irrespective of the wave-length of the radiation at the origin of the variation in temperature.

It is also an object of the invention to provide an optical IFF system incorporating the responder device as defined hereinabove and an interrogation device comprising a pulsed infrared laser transmitter and a thermal imaging device of which the optical axis is aligned with the axis of the transmitted laser beam and having a photo-detection device response to a determined spectral band, the wave-length of the laser beam being included in said spectral band.

The thermal imaging device comprises a further photo-detector responsive to the wave-length of the laser beam, the transmission of the laser pulses occurring in timed relationship with the operation of the scanning device of the imaging device.

Such a system is operative during the daytime as well as at night.

The thermal imaging device provides an image of the remote object to be identified and enables the laser beam to be directed to this object. The detection of a suitably coded reflected signal then makes it possible to determine that the object is friendly.

The invention will be more readily understood on reading the following description with reference to the accompanying drawings, in which.

Figure 1:
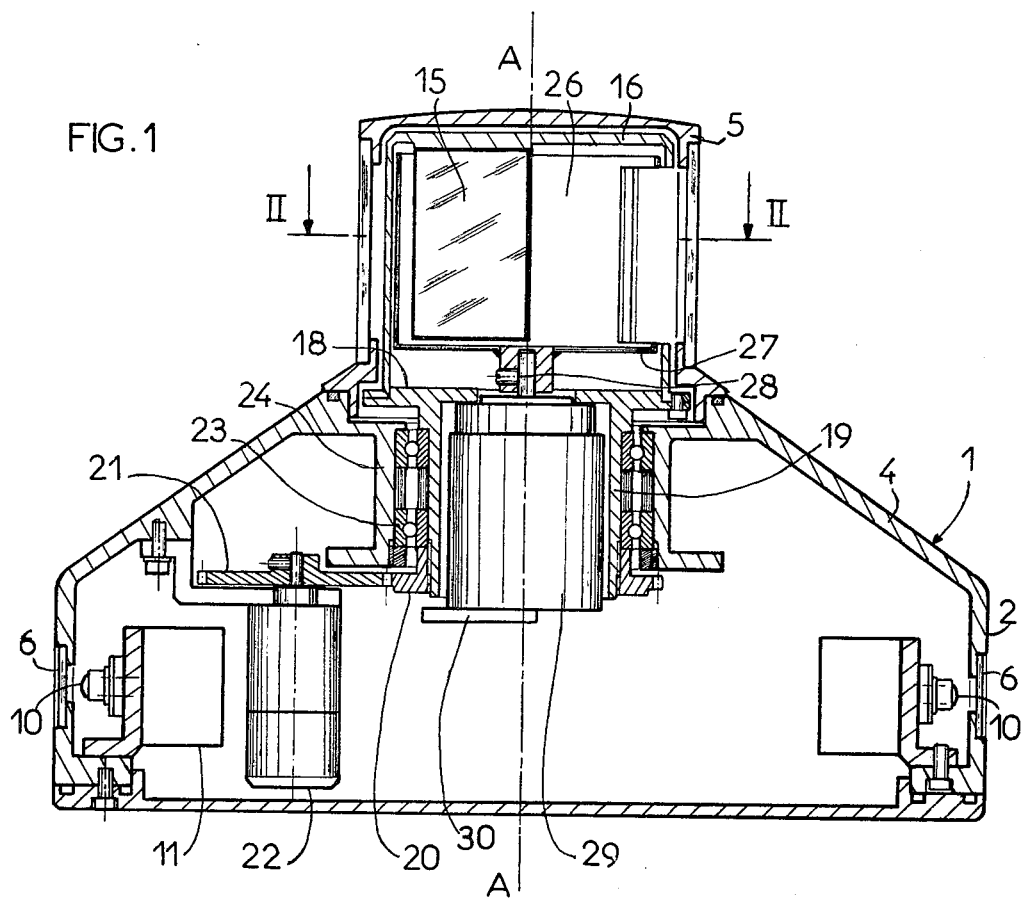
FIG. 1 is an axial section of the responder device according to the invention.

Referring now to the drawings, the responder device for IFF system shown in FIG. 1 is adapted in particular to be mounted on a land vehicle likely to be considered as a military target.

It comprises a casing 1 which is symmetrical about an axis A—A, composed of a cylindrical lower portion 2 to which are fixed a base 3 and a truncated upper portion 4. A dome 5 is mounted on this upper portion, its lateral wall being transparent to the radiation that the device is adapted to receive.

The lower portion 2 comprises a plurality of transparent windows 6, for example twelve in number, equiangularly distributed. Behind each window 6 is located a radiation sensor 10, preferably constituted by a pyroelectric sensor which delivers an electric current in response to a temperature variation. These sensors therefore function virtually irrespective of the wavelength of the radiation at the origin of the temperature variation, and in any case cover the near and intermediate infrared.

The spectral band within which the windows 6 remain transparent may be freely chosen. The windows 6 may thus be used as filters centered on a given wavelength or, on the contrary, may allow all the infrared radiations from 1 to 15 $\mu$m to pass.

The pyroelectric sensors further have the advantage of operating at ambient temperature. A preamplifier 11 is conventionally associated with each sensor 10.

Inside the dome 5 is mounted a retroreflecting corner 15 disposed with its edges parallel to axis A—A. The corner 15, which is more clearly seen in FIG. 2, has the property of reflecting the radiation in the direction from which this radiation comes.

The corner 15 is suspended from a wall 16 integral with a cylindrical shutter 17 centered on axis A—A. The shutter 17 is fixed by its base on the end flange 18 of a sleeve 19 which mounts at its other end a toothed wheel 20 in mesh with a toothed wheel 21 driven by a gear-down motor 22. The sleeve 19 is rotatably mounted via ball bearings 23 in a cylindrical inner extension 24 of the casing 1.

Figure 2:
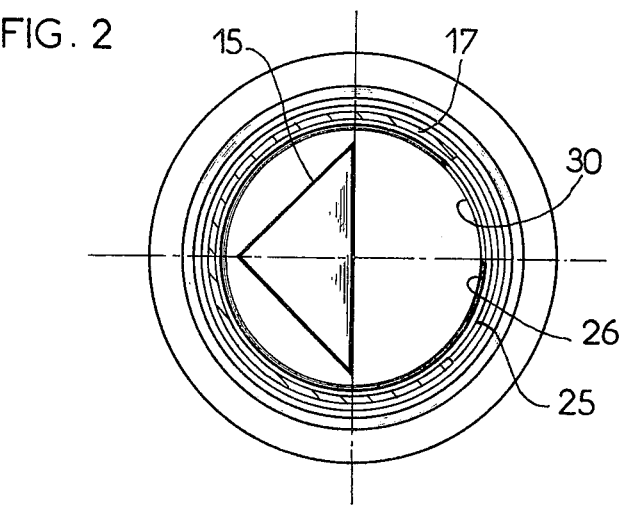
FIG. 2 is a section along line II—II of FIG. 1.

The shape of the shutter 17 is clearly visible in FIG. 2. It comprises an aperture or window 25 oriented axially, of which the centre angle corresponds substantially to the angle of the corner—90° in the shown embodiment—the bisectrix plane of the corner 15 and that of the aperture 25 being merged.

Inside the dome 5, there is also provided a second cylindrical shutter 26 centered on axis A—A, therefore coaxial with respect to shutter 17. The shutter 26 is fixed by its base on a plate 27 itself secured to the driven shaft 28 of a step-by-step motor 29, mounted inside the sleeve 19 and fixed on a plate 30 itself secured to the casing 1.

The shape of the shutter 26 is similar to that of shutter 17, i.e. it comprises an aperture 30 of which the angle at the centre is preferably the same as that of the aperture 25 of the shutter 17.

The outputs of the pre-amplifiers 11 of the sensors are connected to a logic circuit which controls the motors 22 and 29 so as to cause the device described to function as follows:

When a light signal impinges on one (or more) of the sensors 10 and is identified as coming from a friendly interrogation station, the corner 15 and the shutter 17 rotate and are placed in a position enabling the light signal to pass through the aperture 25 and to be relfected by the corner 15. The shutter 26 assumes the same position as the shutter 17, as indicated in FIG. 2, then effects rotary movements so as to interrupt the reflection of the beam with a predetermined timing. This effects an encoding of the reflected beam which enables the interrogation station to identify the vehicle carrying the responder device as friend.

The logic circuit must, in view of the foregoing, perform two functions: The first consists in recognizing whether or not the light signal comes from a friendly source and, in the affirmative, in encoding the light signal reflected; and the second consists in identifying which of the sensors 10 has received the most intense light signal, in order to allow the corner 15 and the shutters 17 and 26 to be suitably oriented.

Reference may be made to the above-mentioned German Patent Application No. 2 453 077 (U.S. Pat. No. 4,143,263) insofar as the first of these functions is concerned.

Figure 3:
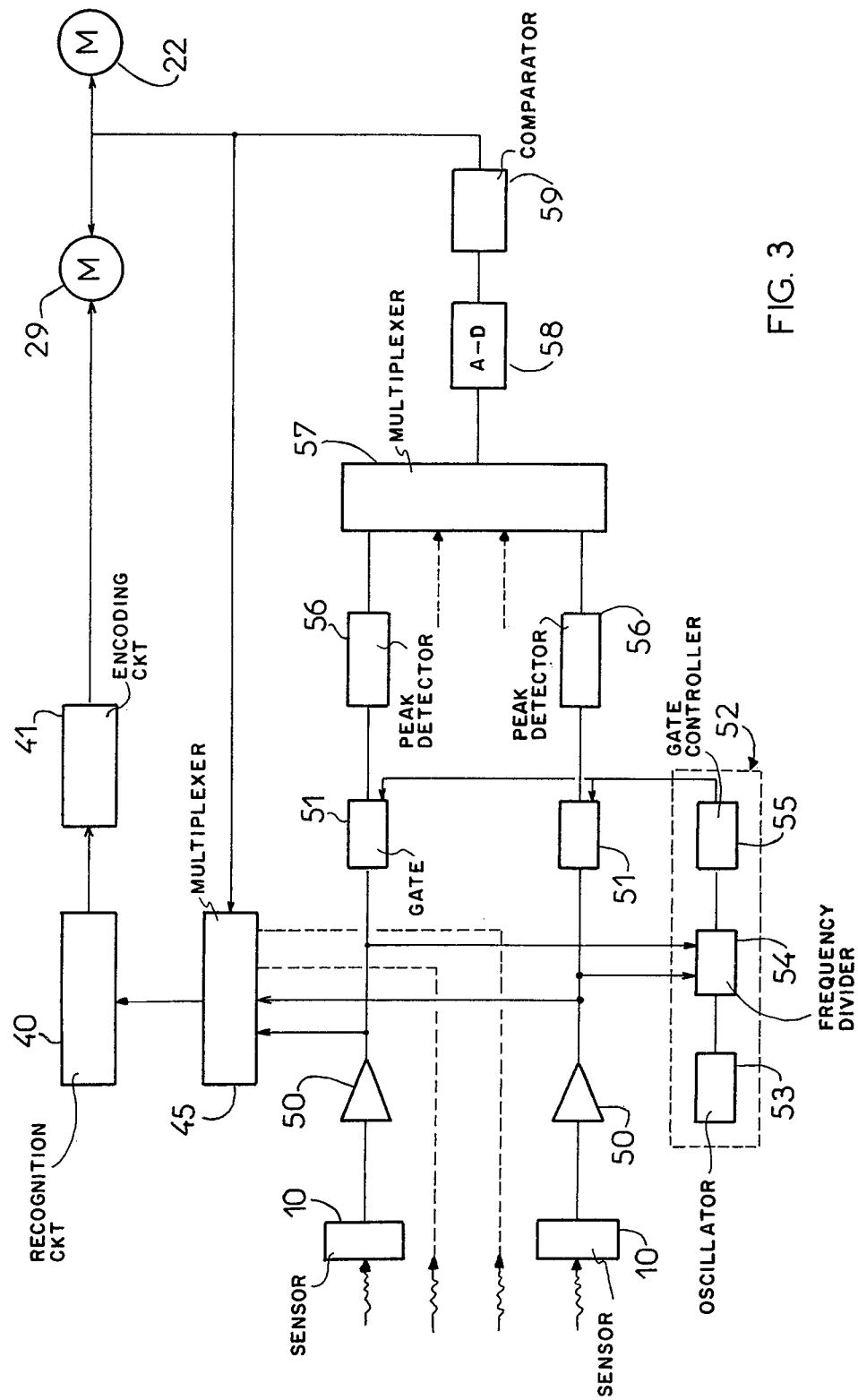
FIG. 3 is a block diagram of the logic circuit controlling the responder device.

In FIG. 3, which represents the logic circuit, blocks 40 and 41 consequently simply show the recognition circuit and the circuit for encoding the reflected beam, respectively.

Insofar as the second function is concerned, the nature of the light signal transmitted by an interrogation station must firstly be specified. It is a coded signal emitted by a pulsed laser, therefore pulses coded in position of very short duration, of the order of $10^{-7}$ s. Furthermore, the transmission frequency of these pulses, which is usually very low, for example 25 Hz, is known.

FIG. 3 shows two of the twelve sensors 10 each provided with a pre-amplifier (not shown here). The output signal of each of the sensors is amplified in an amplifier 50 and applied to a gate 51 at the same time as to a circuit 52 which controls the opening of the gates. The circuit 52 operates in synchronism with the transmission of the light pulses, i.e. it opens the gates 51 for a short time lapse, at a rate equal to the transmission frequency of the pulses —25 Hz in the present embodiment. On the other hand, it is triggered by the first light pulse received by a sensor and, consequently, the periods of opening of the gates 51 may be centered on the instants of transmission of the pulses. The duration of each opening of the gates may be chosen for example to be of the order of 1/10th of the duration between pulses, or 4 ms, this enabling a very efficient temporal filtering to be effected and the maximum of interference signals to be eliminated.

The circuit 52 comprises for example a quartz oscillator 53, a frequency divider 54 associated with the oscillator and triggered by the detection of the first light pulse. From this detection, the divider 54 delivers pulses at the above frequency (25 Hz in the present example) which drive a monostable type element 55 which delivers a signal for opening the gates 52 during the chosen duration.

The signal thus filtered is then applied to a peak detector 56. This latter converts the input signal of very short duration into a signal of much longer duration, for example of about $10^{-4}$ s, and of amplitude proportional to that of the input signal.

In the described embodiment, twelve signals are thus obtained in total which are applied to an analog multiplexer 57. The latter delivers an analog signal which is encoded into a digital signal in an analog-digital converter 58, for example with a 8-bit coding. The digital signal is applied to a comparison circuit 59 which compares the multiplexed components from each sensor in pairs, and passes, each time, only the higher signal. Finally, this enables the address of the sensor having received the most intense signal to be ascertained.

The corresponding data is addressed to the geardown motor 22 and to the step-by-step motor 29 to place the corner 15 and the shutters 17 and 26 in the appropriate angular position.

This data is also applied as control signal to a multiplexer 45 which furthermore receives all the amplified output signals of the sensors 10. The multiplexer 45 thus passes only the signal from the sensor having received the most intense signal. This signal is applied to the recognition circuit 40 already mentioned hereinabove, and in the case it is consistent with the recorded code, the recognition circuit 40 delivers a control order to the encoding circuit 41 which then transmits a control signal acting on the motor 29 of the shutter 26.

Figure 4:
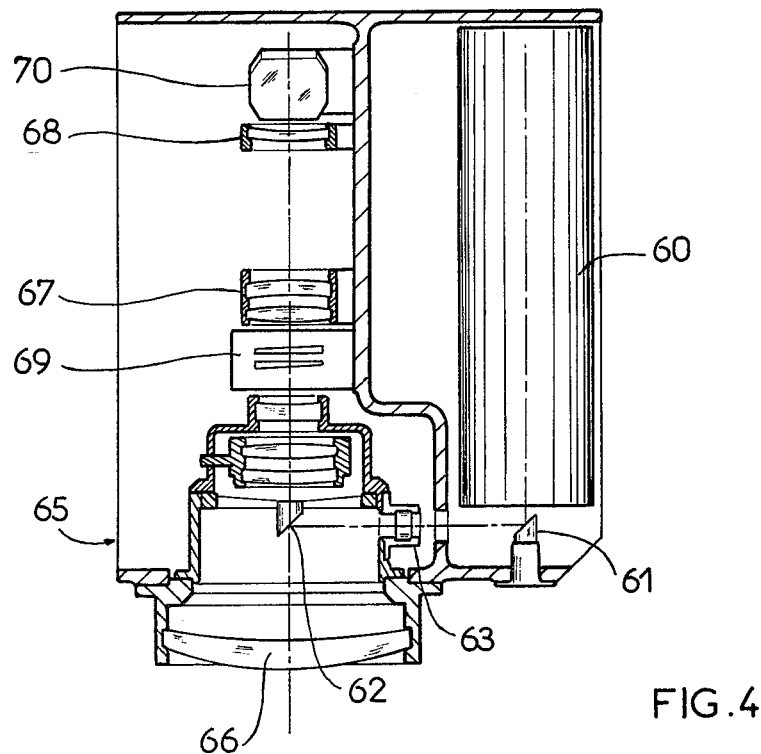
FIG. 4 shows the optical components of the interrogation device of the IFF system according to the invention.

An interrogation station as described hereinafter with reference to FIGS. 4 and 5 may advantageously be associated with the above-described responder device.

Such a station essentially comprises a pulsed laser transmitter 60, for example a $CO_2$ laser, and a thermal camera or imager 65, of which the axes are aligned during manufacture. The wave-length of the laser beam is chosen to be within the spectral band of the detectors of the thermal camera. A $CO_2$ laser may for example be designed to transmit a 10.6 $\mu$m radiation and $Cd_{1-x}Hg_xTe$ detectors may be chosen, to be responsive in the range from 8 to 14 $\mu$m.

Due to this concordance of the wave-lengths of the laser beam transmitted and reflected and of the radiation producing a thermal image, it is possible to use the input lens 66 of the camera as the output lens of the laser beam transmitted and the input lens of the laser beam reflected. To this end, a mirror 61 is provided at the output of the laser transmitter 60 and a mirror 62 disposed so as to cause the axis of the laser beam to merge with the optical axis of the thermal camera, as well as an intermediate optical system 63 to adapt the laser beam to the input lens 66. The mirror 62, being placed at the centre of the field of the camera, creates a slight occultation which causes only negligible loss on the thermal image.

The thermal camera is conventional per se and comprises in particular the focusing lenses 67, 68 and a scanning device 69 which may suitably scan in one direction. A mirror 70 directs the radiation towards the detection device (not shown in FIG. 4), and of which a suitable example has been shown in FIG. 5.

Figure 5:
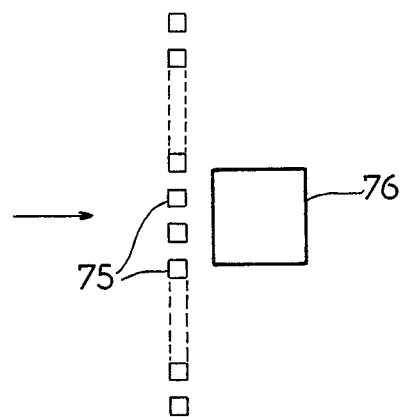
FIG. 5 shows, on a very large scale, an example of the detector arrangement of the interrogation device of FIG. 4.

In FIG. 5, the scanning direction is indicated by the arrow. The detection device conventionally comprises a linear array of elementary detectors 75 disposed perpendicular to the scanning direction and, specifically, a further detector 76 placed in the vicinity of the centre of the field of the camera. The detector 76 serves solely to detect the return of the laser beam transmitted by the station. It is constituted by the same material as the detectors 75, $Cd_{1-x}Hg_xTe$ in the described embodiment, and no particular provision is necessary in this respect. In particular, it functions under the same temperature conditions.

The laser beam produced by the transmitter 60 is composed of light pulses coded in position.

The transmission of the light pulses is advantageously synchronised with the scanning of the camera 65, so that the return of a pulse is produced at the moment when the detector 76 is at the centre of the field. The choice of a given rate for the transmission of the pulses is in fact associated with the image frequency used in the thermal camera. In the example described, the image frequency is 25 Hz, determining an identical pulse transmission frequency.

This may be obtained by using, as a clock for producing the transmission frequency of the light pulses, a device connected to the scanning, for example an angular encoder when the scanning is carried out by a diasporameter as described in French Pat. No. 2 397 623.

The encoding of the beam consists in suppressing pulses in accordance with a programmed pattern. This is effected directly by the electric excitation control of the laser transmitter 60, and does not present any difficulties.

The beam encoding program is recorded in the memory of the recognition circuit 40 of the responder device, and the encoding effected by the encoding circuit 41 consists in suppressing, according to a programmed pattern, a part of the pulses from the signal received, by the action of the shutter 26.

Insofar as the station described hereinabove is concerned, it should be noted that it may also function as a range-finder. In this case, the light beam is not encoded and it is composed of pulses transmitted at a much slower frequency. The beam is not reflected, but only retro-diffused by the target. The detector 76 for IFF detection may also serve for range-finding.

Of course, the electronic circuits connected to the detector 76 are quite distinct from those connected to the detectors 75 of the array. The frequencies used are, moreover, quite different, about 10 MHz for the IFF pulses and about 15 kHz for the thermal imagery.

The interrogation device described will be suitably associated with a missile, for example anti-tank missile, firing station, and the responder devices will be mounted on tanks or similar vehicles.

The IFF system according to the invention has a range of up to 4 km under favourable atmospheric conditions.

What is claimed is:

1. A device adapted to receive coded light signals and to transmit modulated light signals in the direction of the incident signals, comprising an omnidirectional detection device composed of a plurality of radiation sensors, an optical device for reflecting the light signal in its own direction, a recognition and encoding circuit connected to said sensors and an optical modulator operable to prevent the reflection of the light signal, said modulator being controlled by said circuit, said modulator comprising a shutter rotatable about the axis of the detection device, a member for driving the shutter controlled by the recognition and encoding circuit and a second circuit connected to the outputs of the sensors to determine which one of the sensors receives the incident beam, said second circuit delivering to the drive member a control signal for setting the initial angular position of the shutter.

2. The device of claim 1, comprising a single retroreflector rotatable about the same axis as the shutter and a member for driving the retroreflector controlled by said second circuit so as to be orientated in the direction of the sensor receiving the beam.

3. The device of claim 2, comprising a second shutter rotatable with the retroreflector and constituted by a cylindrical wall provided with an aperture of which the width corresponds substantially to the opening of the retroreflector.

4. The device of claim 3, wherein the first shutter is formed by a cylindrical wall provided with an aperture.

5. The device of claim 1, wherein the sensors are pyroelectric sensors.

6. An identification friend or foe, system incorporating the device of claim 1 and an interrogation device comprising a pulsed infrared laser transmitter and a thermal imaging device of which the optical axis is aligned with the axis of the laser beam transmitted and having a photodetection device responsive to a determined spectral band, the wave-length of the laser beam being included in said spectral band.

7. The system of claim 6, wherein the thermal imaging device comprises a further photodetector responsive to the wave-length of the laser beam and a scanning device, the transmission of the laser pulses occurring in timed relationship with the operation of said scanning device.

8. The system of claim 6, wherein the imaging device includes an input lens disposed so as to constitute the output lens of the laser transmitter.

* * * * *